US009425970B2

(12) United States Patent
Yagyu et al.

(10) Patent No.: US 9,425,970 B2
(45) Date of Patent: Aug. 23, 2016

(54) MULTICAST COMMUNICATION METHOD, COMMUNICATION NODE DEVICE AND PROGRAM

(71) Applicant: NEC Corporation, Tokyo (JP)

(72) Inventors: Tomohiko Yagyu, Tokyo (JP); Yui Ikuma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/401,534

(22) PCT Filed: May 17, 2013

(86) PCT No.: PCT/JP2013/063787
§ 371 (c)(1),
(2) Date: Nov. 17, 2014

(87) PCT Pub. No.: WO2013/176051
PCT Pub. Date: Nov. 28, 2013

(65) Prior Publication Data
US 2015/0139226 A1    May 21, 2015

(30) Foreign Application Priority Data

May 21, 2012 (JP) ................................. 2012-115398

(51) Int. Cl.
*H04L 1/00* (2006.01)
*H04L 12/18* (2006.01)
*H04L 12/761* (2013.01)
(Continued)

(52) U.S. Cl.
CPC ............ *H04L 12/18* (2013.01); *H04L 12/1868* (2013.01); *H04L 45/16* (2013.01); *H04L 45/24* (2013.01); *H04L 45/28* (2013.01)

(58) Field of Classification Search
USPC ........ 370/217, 220, 225, 227, 228, 236, 242, 370/248, 351, 390, 431, 432
See application file for complete search history.

(56) References Cited

U.S. PATENT DOCUMENTS 7,289,433 B1 *  10/2007  Chmara ................ H04L 45/586
                                                    370/219
8,572,285 B2 *  10/2013  Huang .................. H04L 49/557
                                                    370/203

(Continued)

FOREIGN PATENT DOCUMENTS

| JP | 06-315060    | 11/1994 |
| JP | 2007-228064  | 9/2007  |
| JP | 2007-535879  | 12/2007 |

OTHER PUBLICATIONS

Adrian Popescu et al., "A Survey of Reliable Multicast Communication", 3rd EuroNGI Conference on Next Generation Internet Networks, May 2007.

(Continued)

*Primary Examiner* — Candal Elpenord
*Assistant Examiner* — Nguyen Ngo
(74) *Attorney, Agent, or Firm* — Young & Thompson

(57) ABSTRACT

Disclosed is a communication node device constituting a communication system performing multicast, which is characterized by that: when having forwarded data to a child node subordinate to it along a normal distribution path, it sets a retransmission timer also with respect to a child node on a redundant distribution path; and when having received data, it sends a reception confirmation message to both the parent node of the normal distribution path and a parent node of the redundant distribution path.

6 Claims, 19 Drawing Sheets

(51) Int. Cl.
*H04L 12/707* (2013.01)
*H04L 12/703* (2013.01)

(56) References Cited

U.S. PATENT DOCUMENTS

| | | |
|---|---|---|
| 2005/0243722 A1 | 11/2005 | Liu et al. |
| 2005/0281215 A1* | 12/2005 | Budampati ............ H04L 1/1887 370/328 |
| 2008/0192709 A1* | 8/2008 | Mikami .............. H04L 12/2854 370/338 |
| 2012/0294177 A1* | 11/2012 | Yan ..................... H04L 45/02 370/252 |
| 2013/0051250 A1* | 2/2013 | Shaffer ................. H04L 45/22 370/252 |
| 2013/0286893 A1* | 10/2013 | Zhu ....................... H04L 45/64 370/254 |
| 2014/0226475 A1* | 8/2014 | Stewart ................. H04L 47/20 370/230.1 |
| 2014/0241315 A1* | 8/2014 | Niu ..................... H04L 67/1091 370/331 |

OTHER PUBLICATIONS

Yoshihiko Ikenaga, "Overlay Multicast System with Adaptability to Heterogeneous and Dynamic Environments", IPSJ SIG notes, vol. 2007, No. 24, Mar. 9, 2007, pp. 13-18.

International Search Report PCT/JP2013/063787 dated Aug. 20, 2013.

* cited by examiner

MULTICAST COMMUNICATION METHOD, COMMUNICATION NODE DEVICE AND PROGRAM

TECHNICAL FIELD

The present invention relates to a multicast communication method, a communication node device and a program which perform multicast distribution in a redundant manner, to deal with network failure, and also does confirmation of reception.

BACKGROUND ART

Research has been conducted for many years on IP multicast which distributes an IP packet sent by a certain sender to a group (IP multicast address) to all recipients belonging to the multicast group. As one sort of it, reliable multicast which performs confirmation of reception has also been studied. In recent years, a large amount of research has been conducted on overlay multicast particularly because of its easiness in being put into widespread use. For example, representative researches on them are introduced in Non-patent Literature (NPL) 1.

CITATION LIST

Non Patent Literature

[NPL 1] Popescu, A, et al., "A Survey of Reliable Multicast Communication", 3rd EuroNGI Conference on Next Generation Internet Networks, May 2007.

SUMMARY OF INVENTION

Technical Problem

In overlay multicast, a path between multicast nodes (hereafter, referred to simply as nodes) is controlled by unicast routing. For example, an optimum path between multicast nodes is selected on the basis of a routing protocol such as OSPF (Open Shortest Path First) defined in RFC (Request For Comment) 2328 of the IETF (Internet Engineering Task Force). If a failure occurs on a transmission path or at a node of a network, new link state information is advertised within the network and new paths are calculated, on the basis of OSPF. In a large-scale network, it sometimes takes about several minutes until new paths are set. During that period, communication between overlay multicast nodes may become impossible. If communication between nodes becomes impossible, distribution of multicast data is interrupted at that point. As a result, for data to be distributed within a restricted time and the like, there arises a problem in that multicast data cannot be delivered within a time corresponding to the restricted time.

The present invention has been made in view of the above-described problem, and accordingly, its objective is to provide a multicast communication method, a communication node device and a program which, in overlay multicast, enable secure data distribution within a restricted time and also enable a sending node to confirm a reception status, even at a time of network failure.

Solution to Problem

A multicast communication method according to the present invention is characterized by that, in a network constituted by a plurality of communication nodes, a parent node sets a retransmission timer also with respect to a child node on a redundant distribution path when the parent node has forwarded data to a child node subordinate to it along a normal distribution path, and that a child node sends a reception confirmation message to both the parent node of the normal distribution path and the parent node of the redundant distribution path when the child node has received data.

A communication node device according to the present invention constitutes a communication system performing multicast, and is characterized by that it sets a retransmission timer also with respect to a child node on a redundant distribution path when having forwarded data to a child node subordinate to it along a normal distribution path, and that it sends a reception confirmation message to both the parent node of the normal distribution path and the parent node of the redundant distribution path when having received data.

A program according to the present invention is characterized by that, in multicast communication, it causes a computer to execute a step of setting a retransmission timer also with respect to a child node on a redundant distribution path when having forwarded data to a child node subordinate to it along a normal distribution path, and a (sending) step of sending a reception confirmation message to both the parent node of the normal distribution path and the parent node of the redundant distribution path when having received data.

Advantageous Effects of Invention

An exemplary advantage according to the invention is that, in overlay multicast, data distribution can be performed securely within a restricted time and a sending node can confirm a reception status, even at a time of network failure.

DESCRIPTION OF EMBODIMENTS

Hereinafter, an exemplary embodiment of the present invention will be described with reference to drawings.

Figure 1:
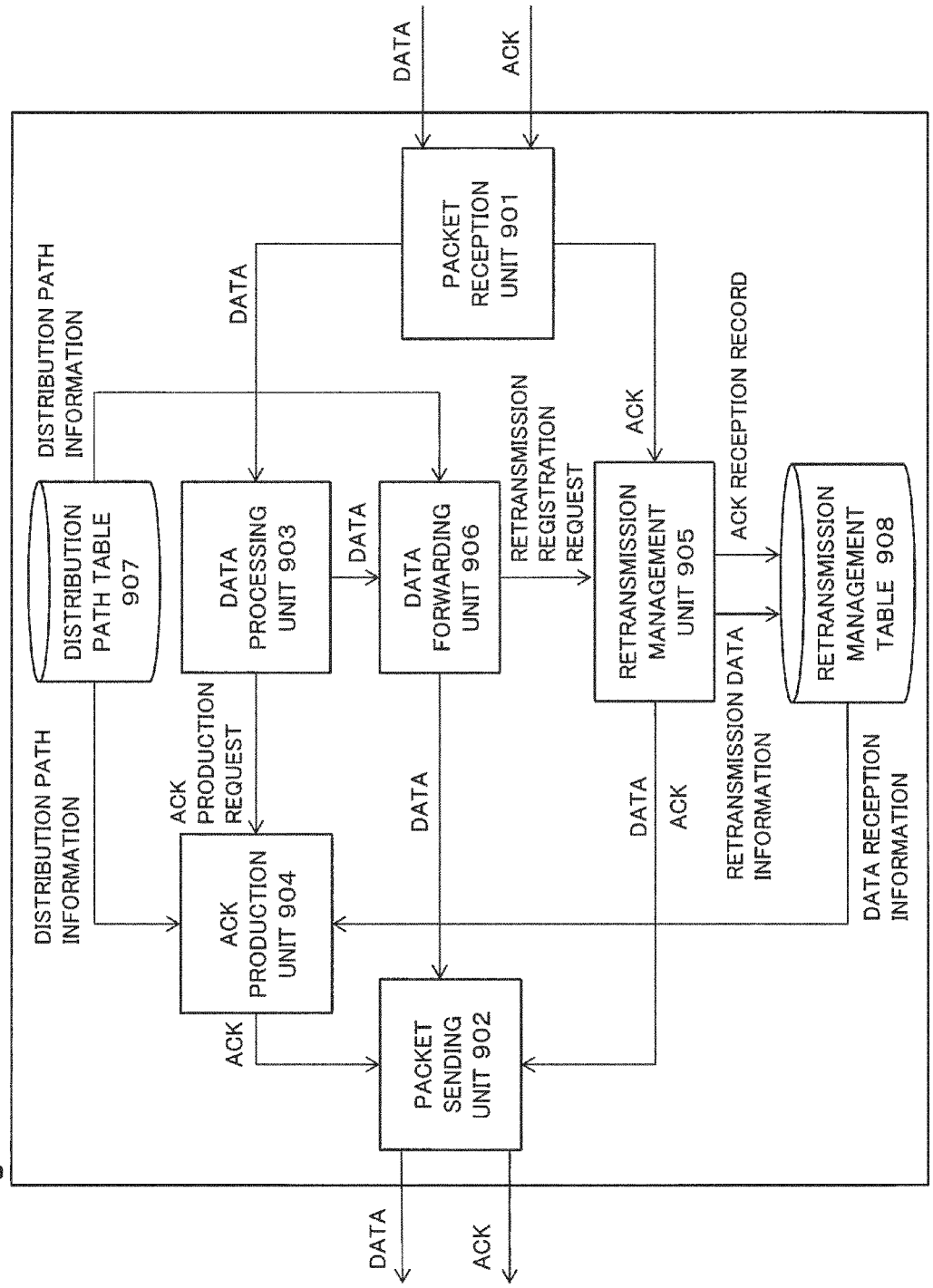
FIG. 1 is a functional configuration diagram of a communication node device according to an exemplary embodiment of the present invention.

FIG. 1 shows a configuration of a communication node device according to the exemplary embodiment of the present invention. The communication node device according to the exemplary embodiment of the present invention includes a packet reception unit 901, a packet sending unit 902, a data processing unit 903, an ACK production unit 904, a data forwarding unit 906, a retransmission management unit 905, a distribution path table 907 and a retransmission management table 908.

In the distribution path table 907, parent nodes and child nodes are registered in advance with respect to both a normal and a redundant distribution paths. The distribution paths will be described later.

In the retransmission management table 908, retransmission data information such as on a retransmission timer with respect to a node to which data has been sent, information on an ACK (reception confirmation message) received from another node, data reception information on received data (including information on the sender node), and the like are recorded.

The packet reception unit 901 receives a packet (data or an ACK) from another communication node device. When having received data, the packet reception unit 901 transfers the received data to the data processing unit 903. When having received an ACK, the packet reception unit 901 transfers the received ACK to the retransmission management unit 905.

The packet sending unit 902 sends data or an ACK, which has been requested, to another communication node.

The data processing unit 903 transfers the data received from the packet reception unit 901 to the data forwarding unit 906 and issues an ACK production request to the ACK production unit 904.

The ACK production unit 904 determines nodes to which an ACK is to be sent, on the basis of the distribution path table 907, and produces the ACK. The destinations of the ACK are parent nodes (of the normal path and the redundant path) registered in the distribution path table 907. When producing the ACK, the ACK production unit 904 acquires information on the sender node of the data from the retransmission management table 908 and, if the sender node is the parent node of the redundant distribution path, adds information for ACK forwarding to the ACK. The information for ACK forwarding contains information on the parent node of the redundant distribution path, which is the sender, and information on the parent node of the normal distribution path. After producing the ACK, the ACK production unit 904 requests the packet sending unit 902 to send the ACK.

The data forwarding unit 906 acquires distribution path information registered in the distribution path table 907, and determines to which nodes the data is to be forwarded. After determining the nodes to be the destinations for forwarding the data, the data forwarding unit 906 requests the packet sending unit 902 to send the data. It subsequently requests the retransmission management unit 905 to set a retransmission timer with respect to the data.

In response to the request from the data forwarding unit 906, the retransmission management unit 905 sets a retransmission timer with respect to each recipient node. When the data has been forwarded to a subordinate node along the normal distribution path, a retransmission timer is set with respect to each of the child nodes on the normal path and on the redundant path. The retransmission management unit 905 records information on an ACK from the packet reception unit 901 into the retransmission management table 908 and then releases the corresponding retransmission timer. In a case information for ACK forwarding was added to the ACK received from the packet reception unit 901, if a parent node of a redundant distribution path, being the sender of the corresponding data, indicated by the information for ACK forwarding is equal to the node itself, the retransmission management unit 905 requests the packet sending unit 902 to forward the ACK to the parent node of the normal distribution path indicated by the information for ACK forwarding.

Figure 2:
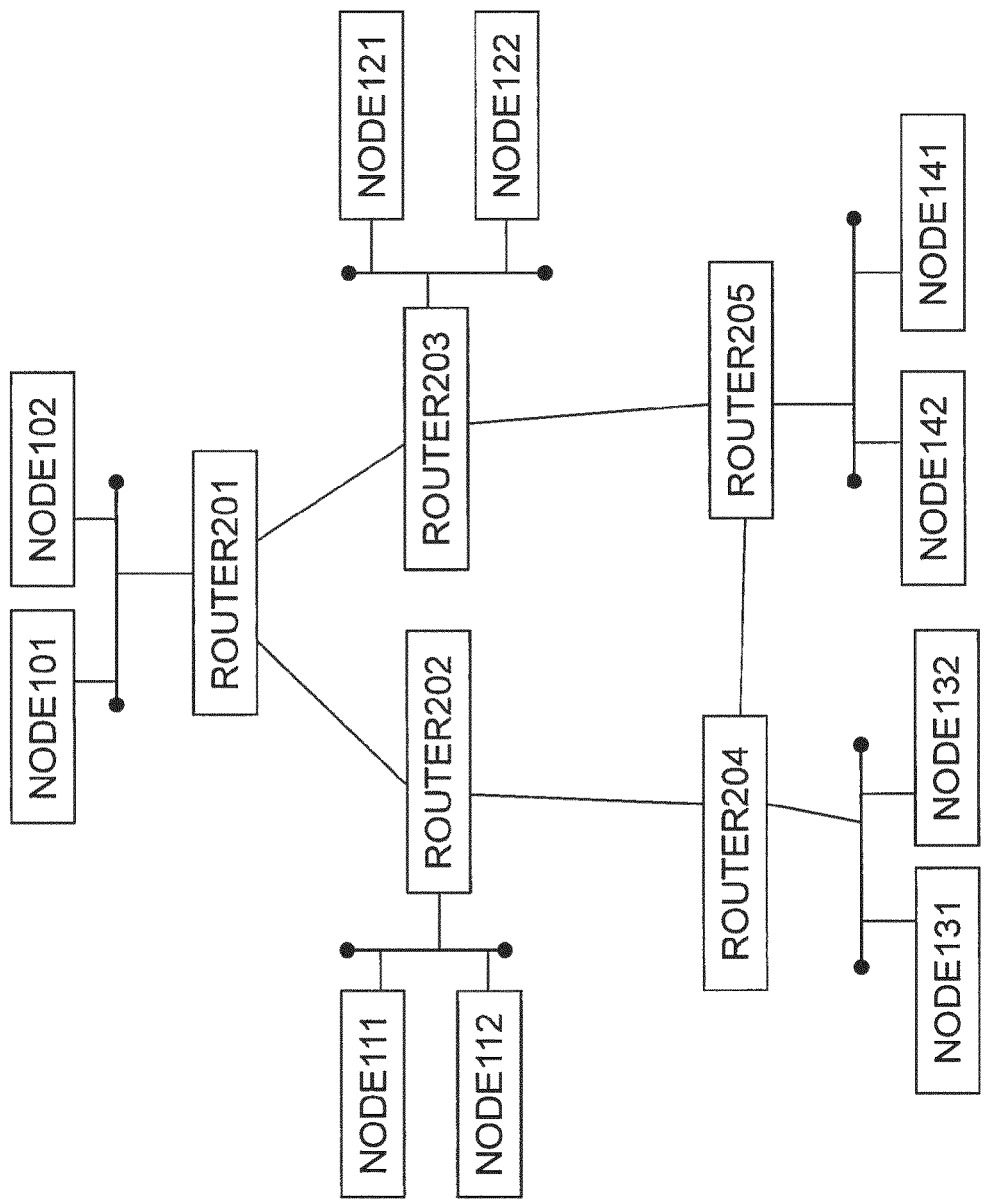
FIG. 2 is a diagram showing an example of a network configuration for implementing the present invention.

FIG. 2 shows an example of a network configuration for implementing the present invention. In FIG. 2, ten communication node devices (hereafter, referred to simply as nodes) 101, 102, 111, 112, 121, 122, 131, 132, 141 and 142 are illustrated as examples. The nodes 101 and 102 are connected to the same LAN (Local Area Network), and also are the nodes 111 and 112, the nodes 121 and 122, the nodes 131 and 132 and the nodes 141 and 142, respectively. The LAN is configured by five routers 201 to 205, which are connected in a ring-like form.

All of the nodes belong to the same multicast group (hereafter, referred to simply as a group), and multicast data (hereafter, referred to simply as data) is distributed by overlay multicast. Here, the node 101 is referred to as the origin node which generates data, and all of the other nodes as recipient nodes which receive the data. The nodes 111, 121, 131 and 141 each play the role of a forwarding node which forwards data on the corresponding LAN.

Figure 3:
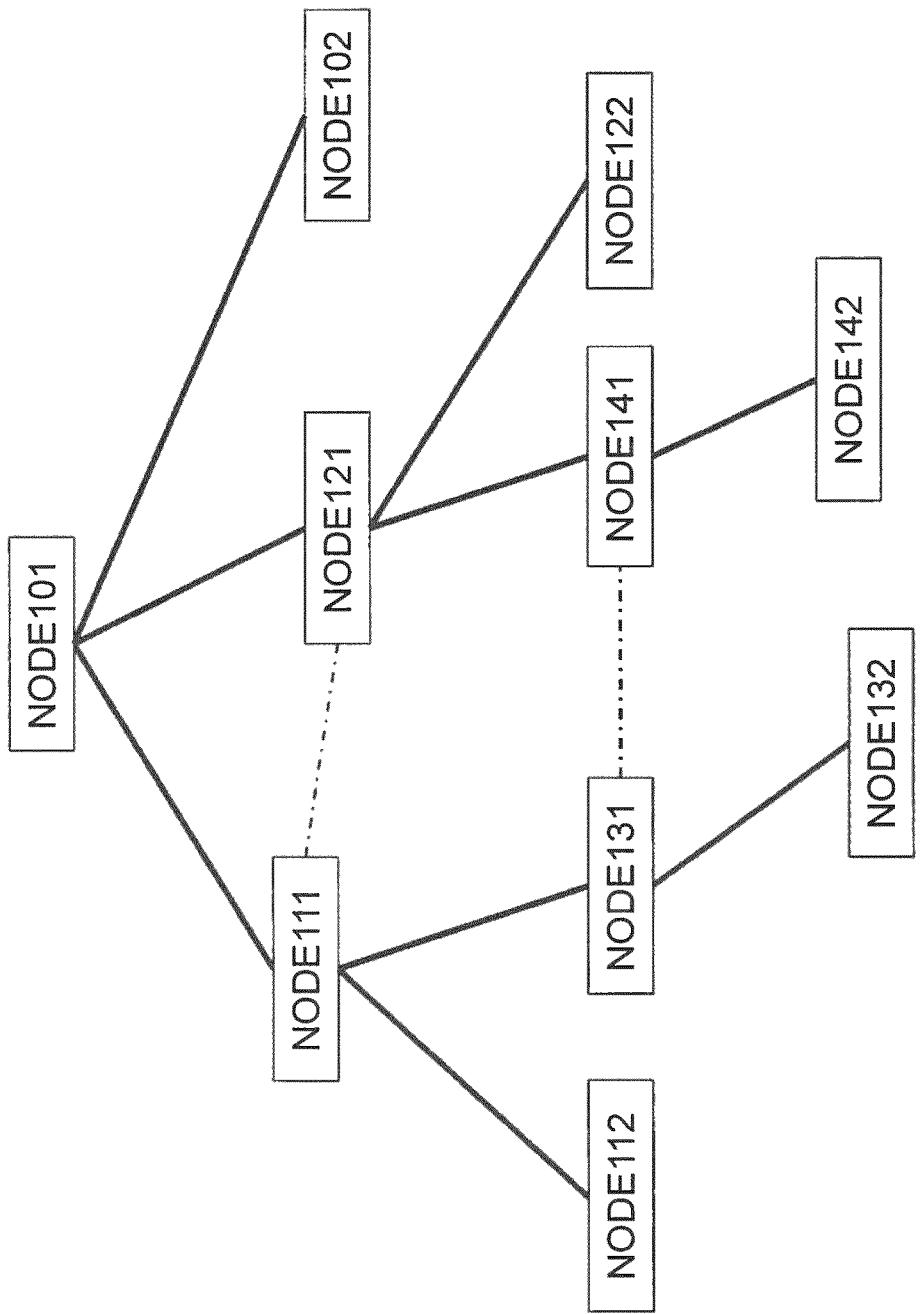
FIG. 3 is a diagram showing an example of a distribution tree.
Figure 4:
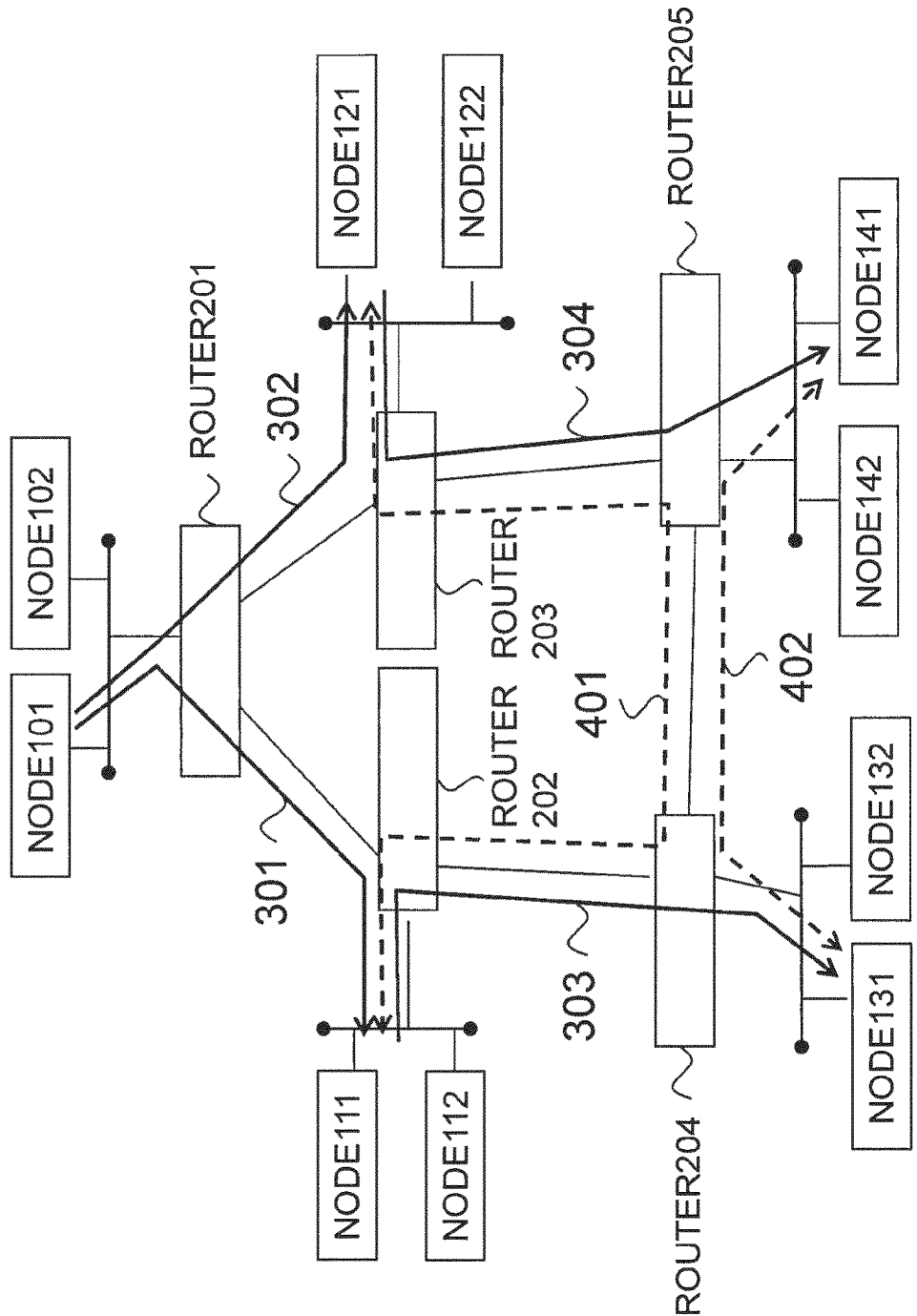
FIG. 4 is a diagram for explaining a communication sequence in a normal state.

Data distribution from the node 101 is performed according to a distribution tree illustrated in FIG. 3 as an example. In the example shown in FIG. 3, the normal forwarding paths are expressed by solid lines, and redundant forwarding paths, which are used when an upper-level path is interrupted, are expressed by dotted lines. The normal forwarding path and the corresponding redundant forwarding path are set such that their links do not overlap with each other. For example, with respect to the node 121, different links are used for the path from the node 101 to the node 121 and for the path from the node 111 to the node 121. FIG. 4 shows an example of actual setting of paths between nodes in a network. As a result of the setting where the path 302 between the nodes 101 and 121 passes through different links from those the path 401 between the node 111 and 121 does, it never happens that both of the paths become interrupted simultaneously owing to a single link failure.

(1) Forwarding Sequence in Normal State

First, a description will be given of a procedure of data forwarding in a normal state where no failure has occurred, with reference to FIGS. 5 to 10. In each of the drawings, flows of packets (data or ACKs) between the nodes are expressed by directional lines. Transmission by IP unicast is expressed by a solid directional line, and that by IP multicast is expressed by a dotted directional line.

Each piece of data can be uniquely identified by the origin node 101 adding a sequence number to it. Each ACK contains information corresponding to (origin node ID, group ID, sequence number), which makes it possible to identify with respect to which data the ACK is sent as a reception notification.

In the present invention, two kinds of ACKs for notifying reception are defined. One is an ACK(Complete), and the other is an ACK(Pending). The ACK(Complete) is sent back to a node being the origin of data forwarding (the parent node of the distribution path) when a recipient node being a node not to perform further forwarding has received the data or when a node to perform forwarding has received an ACK (Complete) from every recipient node to which the node is responsible for the data forwarding. The ACK(Pending) is sent back to a node being the origin of data forwarding when a forwarding node being a node to perform data forwarding has received the data, in order to notify the data reception by itself before forwarding the data.

Figure 5:
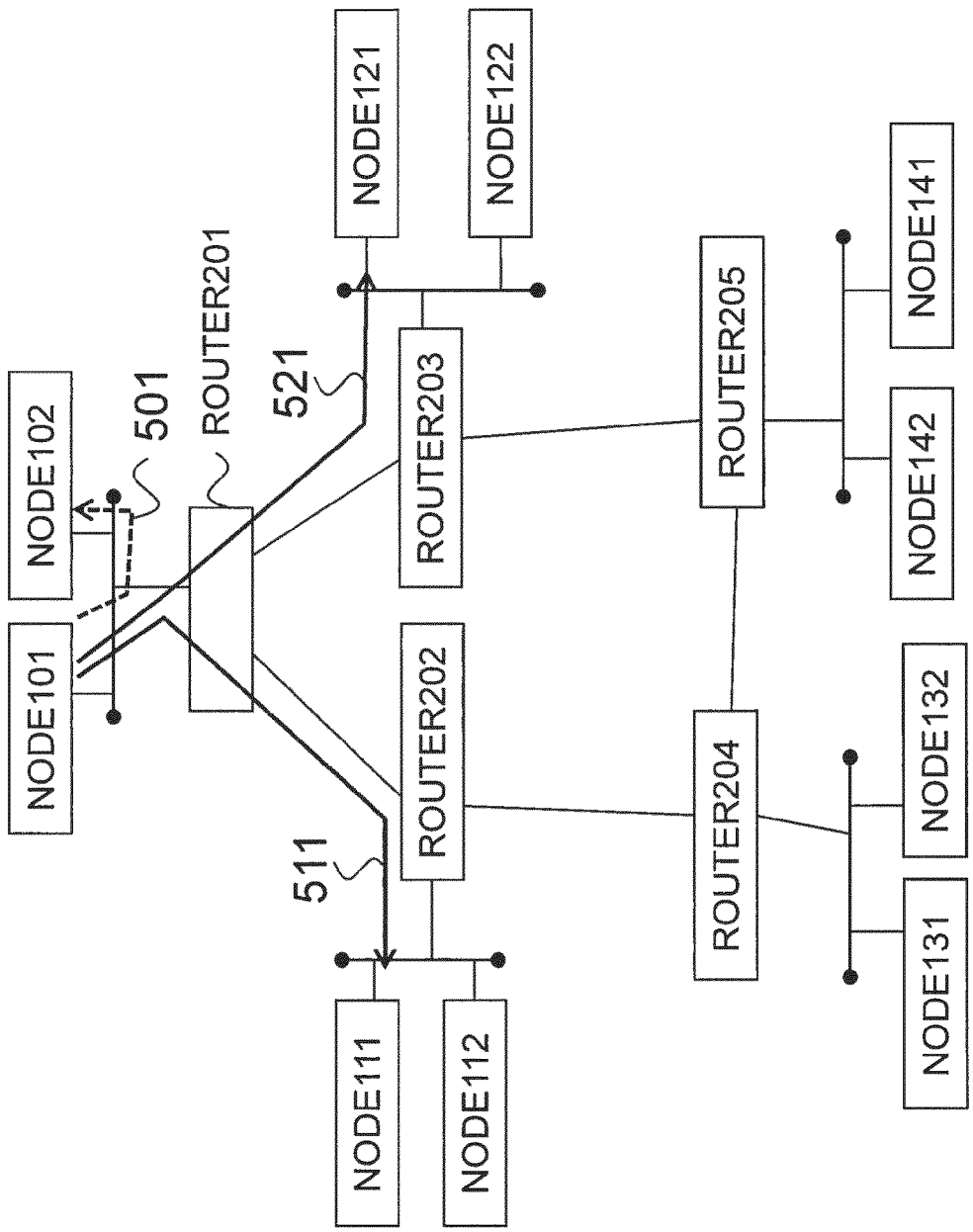
FIG. 5 is a diagram for explaining the communication sequence in the normal state.

In FIG. 5, when data to be sent has been generated, the origin node 101 sends the data by IP multicast to all recipient nodes connected to the LAN (501). It further sends the data by IP unicast to the nodes 111 and 112, which are forwarding nodes each connected to another LAN (511 and 521). After the sending, the node 101 sets retransmission timers with respect to the nodes 111, 121 and 102.

Figure 6:
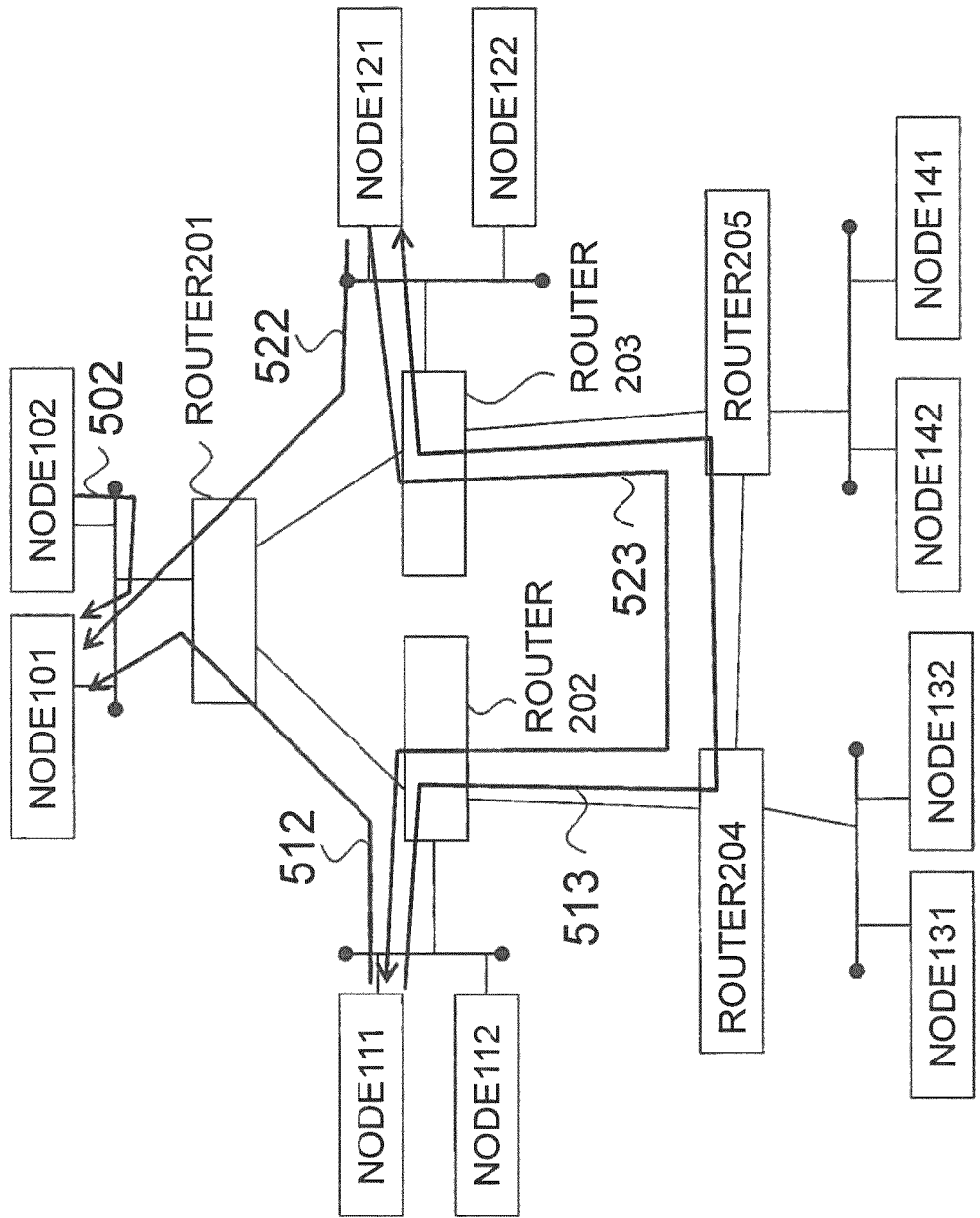
FIG. 6 is a diagram for explaining the communication sequence in the normal state.

As shown in FIG. 6, the node 102 having received the data sent by IP multicast via the LAN sends back an ACK(Complete) representing the data reception to the node 101 by IP unicast (502). Receiving the ACK from the node 102, the node 101 releases the retransmission timer with respect to the node 102.

The nodes 111 and 121 having received the data from the origin node 101 each send an ACK(Pending) to the node 101 (512 and 513). Further, each of the nodes 11 and 121 also sends an ACK(Pending) to the other being the parent of the corresponding redundant forwarding path (513 and 523). Receiving the ACKs from the nodes 111 and 121, the node 101 releases the retransmission timers with respect to the nodes 111 and 121. The nodes 11 and 121 store respective ones of the ACKs (513, 523) each received from the other node.

Figure 7:
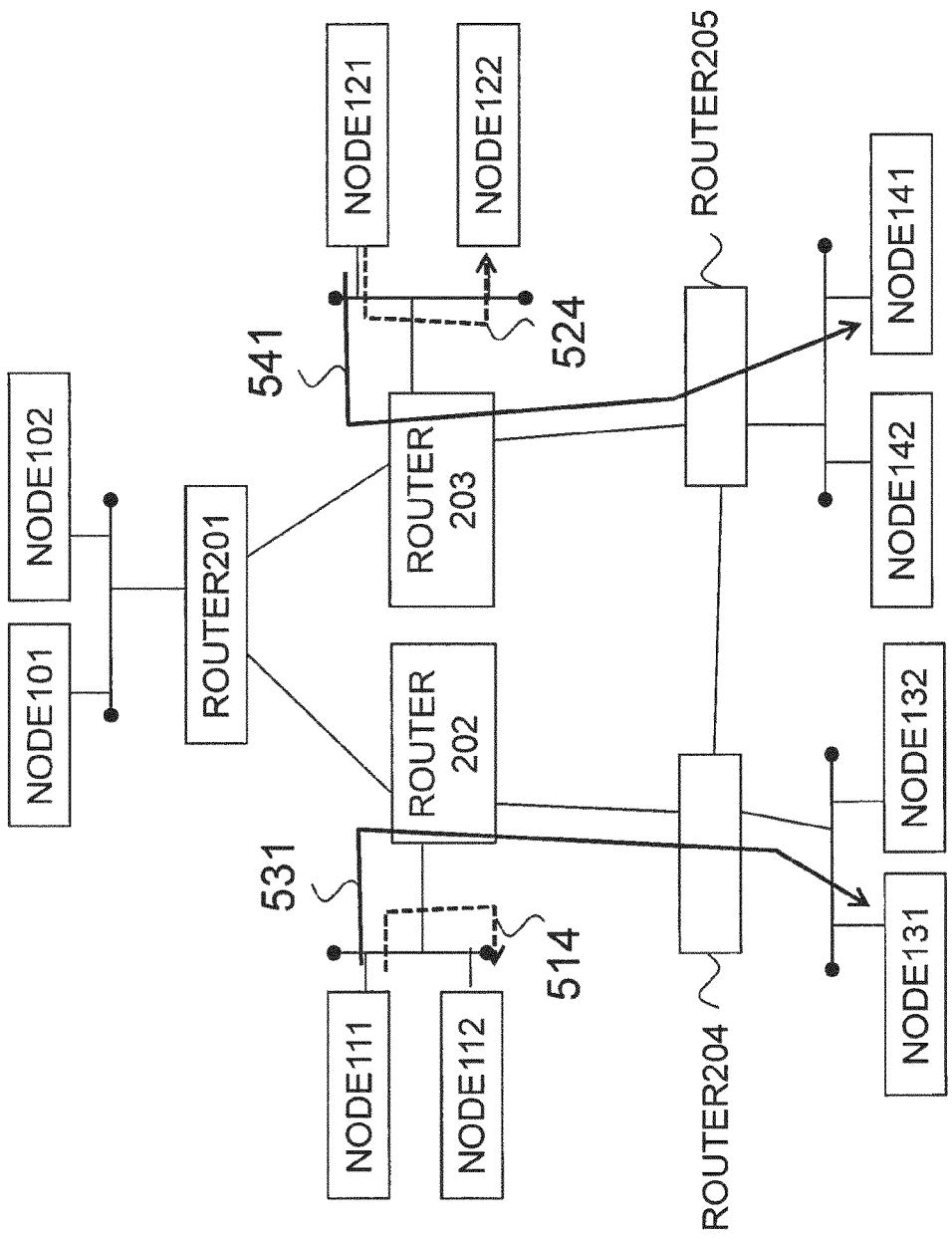
FIG. 7 is a diagram for explaining the communication sequence in the normal state.

As shown in FIG. 7, the node 111 forwards the received data to the node 112 by IP multicast via the LAN (514). It further forwards the data to the node 131, which is a forwarding node connected to another LAN, by IP unicast (531). The node 111 sets retransmission timers with respect to the nodes 112 and 131. Here, no retransmission timer is set with respect to the node 121 because an ACK (523) has already been received from the node 121 with respect to the data.

The node 121 forwards the received data to the node 122 by IP multicast via the LAN (524). It further forwards the data to the node 141, which is a forwarding node connected to another LAN, by IP unicast (541). The node 121 sets retransmission timers with respect to the nodes 122 and 141. Here, no retransmission timer is set with respect to the node 111 because an ACK (513) has already been received from the node 111 with respect to the data.

Figure 8:
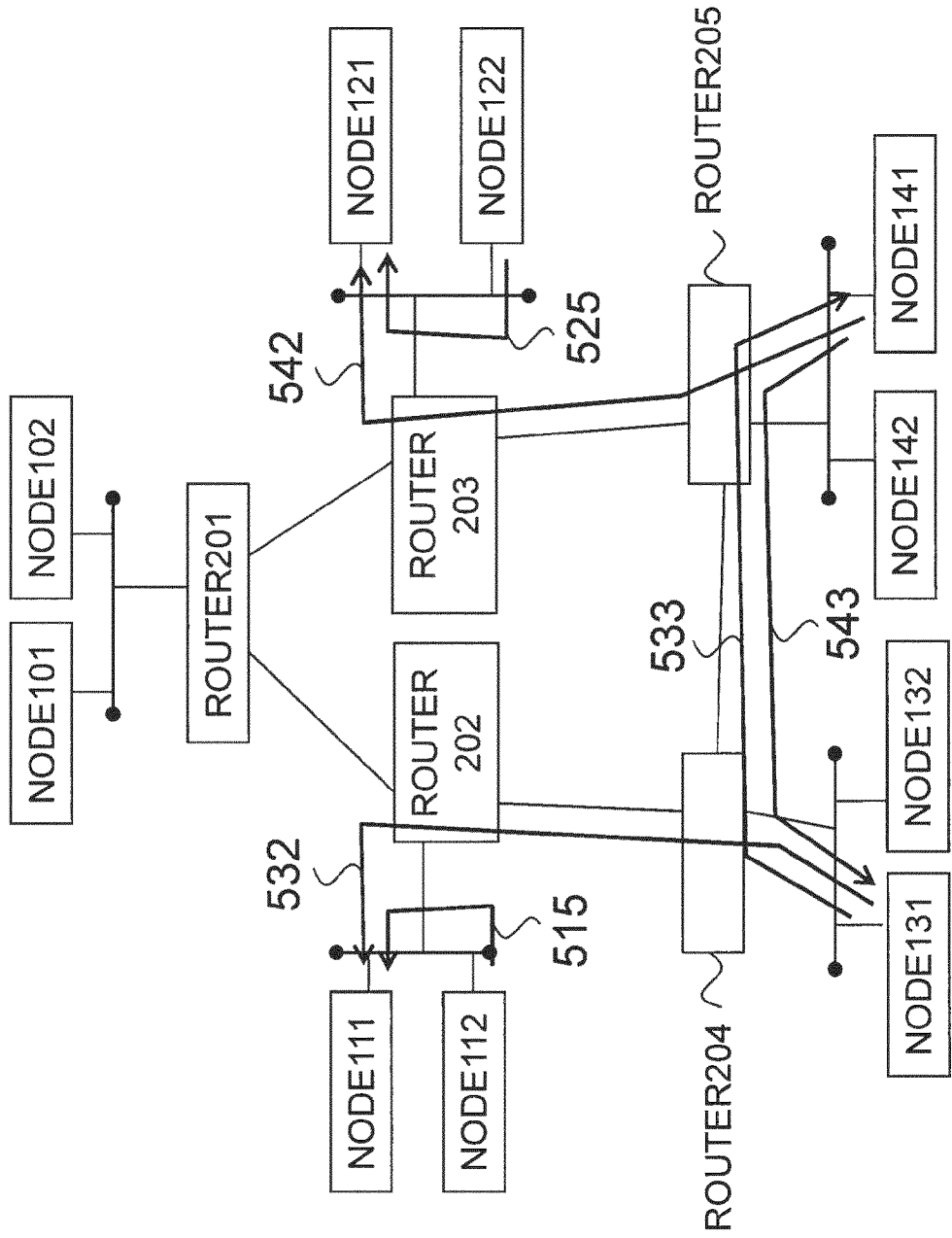
FIG. 8 is a diagram for explaining the communication sequence in the normal state.

As shown in FIG. 8, after receiving the data, the node 112 sends back an ACK(Complete) to the node 111 (515). Receiving the ACK, the node 111 releases the retransmission timer with respect to the node 112.

After receiving the data, the node 131 sends back an ACK (Pending) to the node 111 (532). Receiving the ACK, the node 111 releases the retransmission timer with respect to the node 131. The node 131 further sends back an ACK(Pending) also to the node 141, which is the parent node of the corresponding redundant forwarding path (533). The node 141 stores the received ACK.

After receiving the data, the node 122 sends back an ACK (Complete) to the node 121 (525). Receiving the ACK, the node 121 releases the retransmission timer with respect to the node 122.

When having received the data, the node 141 sends back an ACK(Pending) to the node 121 (542). Receiving the ACK, the node 121 releases the retransmission timer with respect to the node 141. The node 141 further sends back an ACK(Pending) also to the node 131, which is the parent node of the corresponding redundant forwarding path (543). The node 131 stores the received ACK.

Figure 9:
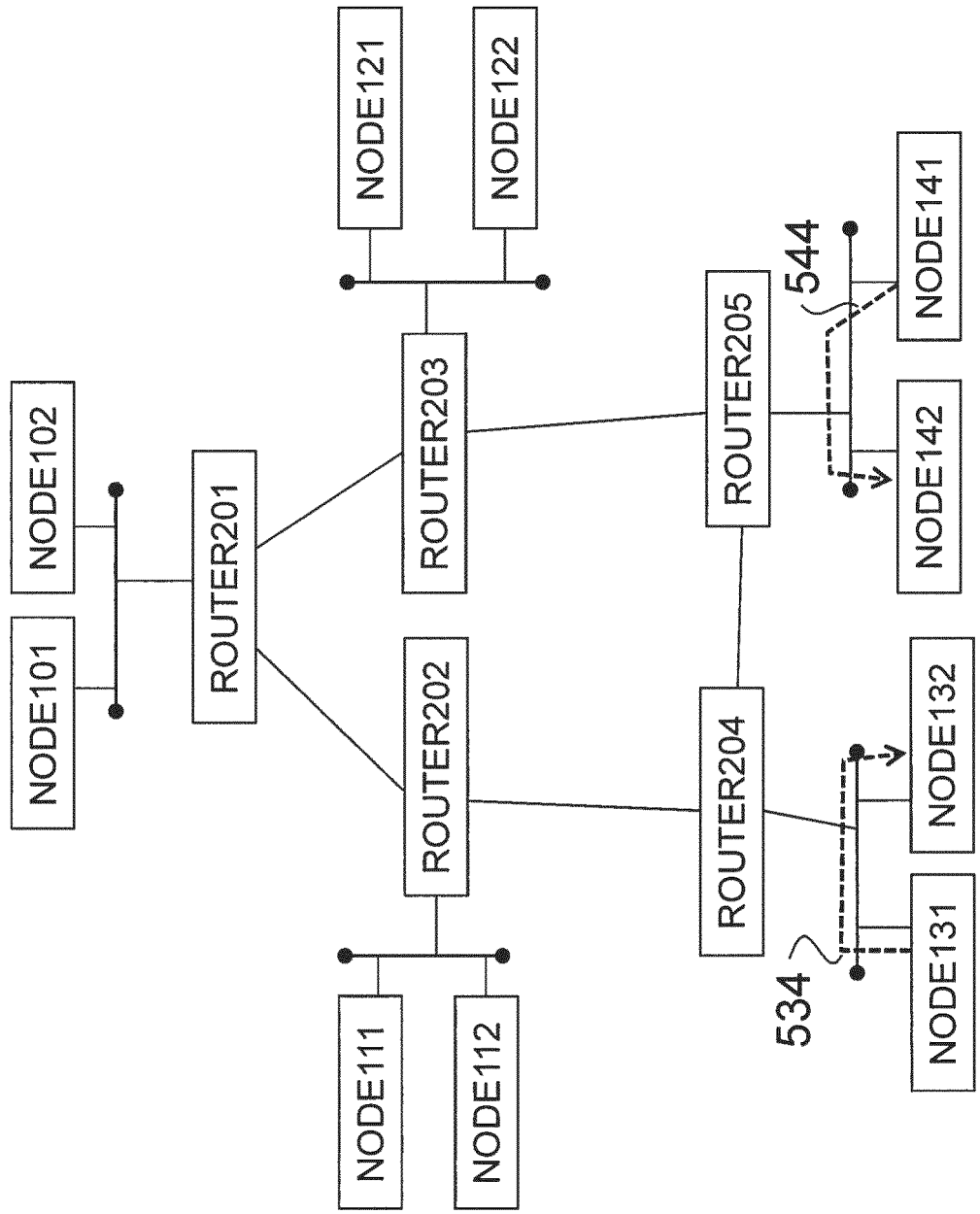
FIG. 9 is a diagram for explaining the communication sequence in the normal state.

As shown in FIG. 9, the node 131 forwards the received data to the node 132 by IP multicast via the LAN (534), and sets a retransmission timer with respect to the node 132. Similarly, the node 141 forwards the received data to the node 142 by IP multicast via the LAN (544), and sets a retransmission timer with respect to the node 142.

Figure 10:
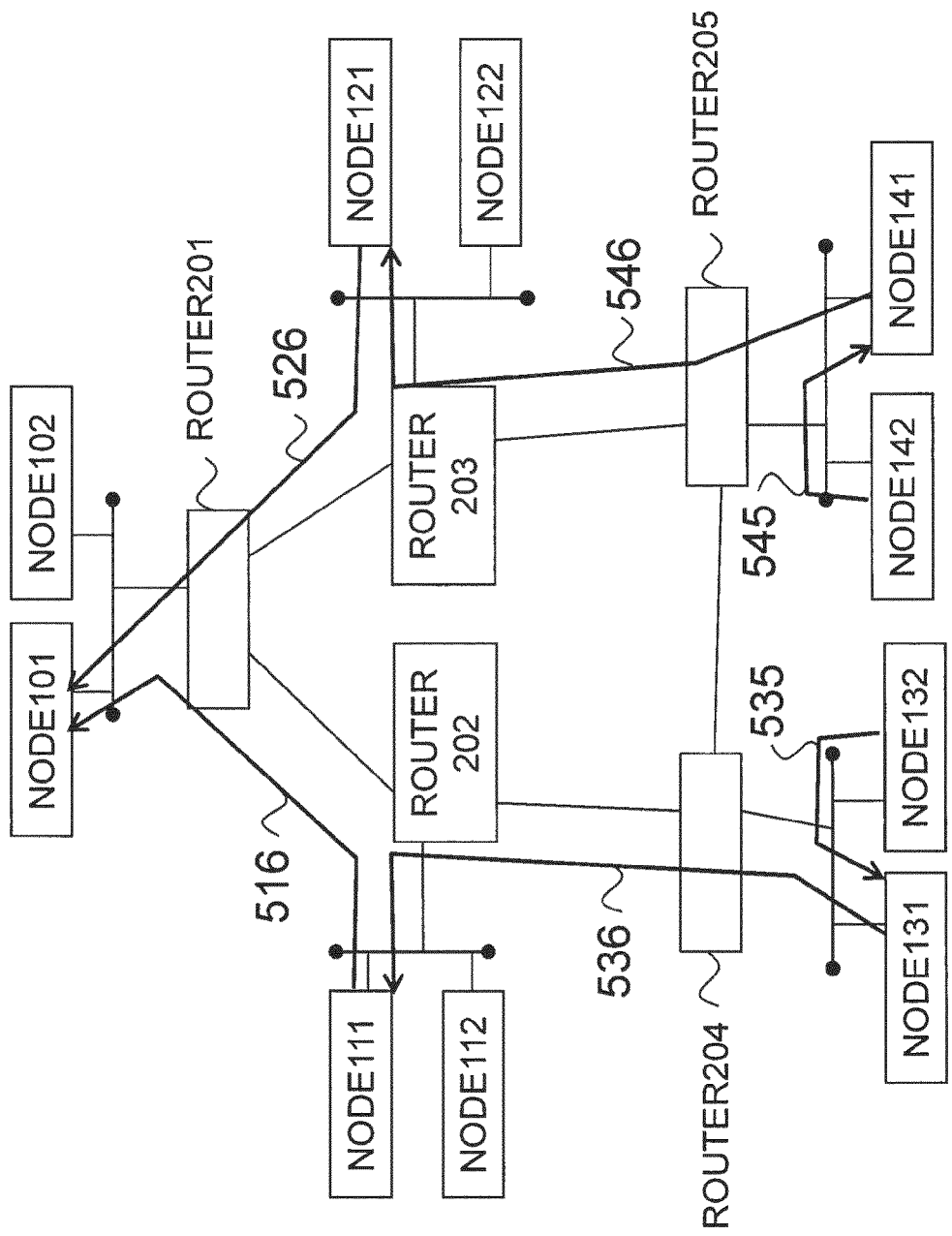
FIG. 10 is a diagram for explaining the communication sequence in the normal state.

As shown in FIG. 10, when having received the data, the node 132 sends back an ACK(Complete) to the node 131 (535). Receiving the ACK, the node 131 releases the retransmission timer with respect to the node 132. Because the node 131 has received an ACK(Complete) from every recipient node on the forwarding paths it is to be responsible for, it sends back an ACK(Complete) to the node 111 (536). Receiving the ACK(Complete) from the node 131, the node 111 becomes in a state where it has received an ACK(Complete) from every recipient node on the forwarding paths it is to be responsible for, and accordingly, the node 111 sends back an ACK(Complete) to the node 101 (516).

Receiving the data, the node 142 sends back an ACK(Complete) to the node 141 (545). Receiving the ACK, the node 141 releases the retransmission timer with respect to the node 142. Because the node 141 has received an ACK(Complete) from every recipient node on the forwarding paths it is to be responsible for, it sends back an ACK(Complete) to the node 121 (546). Receiving the ACK(Complete) from the node 141, the node 121 becomes in a state where it has received an ACK (Complete) from every recipient node on the forwarding paths it is to be responsible for, and accordingly, the node 121 sends back an ACK(Complete) to the node 101 (526). By thus receiving an ACK(Complete) from every recipient node on the forwarding paths it is to be responsible for, the node 101 confirms that all recipient nodes in the network have received the data.

(2) Data Forwarding Sequence in Link Failure State

Next, a description will be given of a forwarding sequence performed when a link failure has occurred between the routers 201 and 203 and accordingly the communication between the nodes 101 and 121 is interrupted, with reference to FIGS. 11 to 19.

Figure 11:
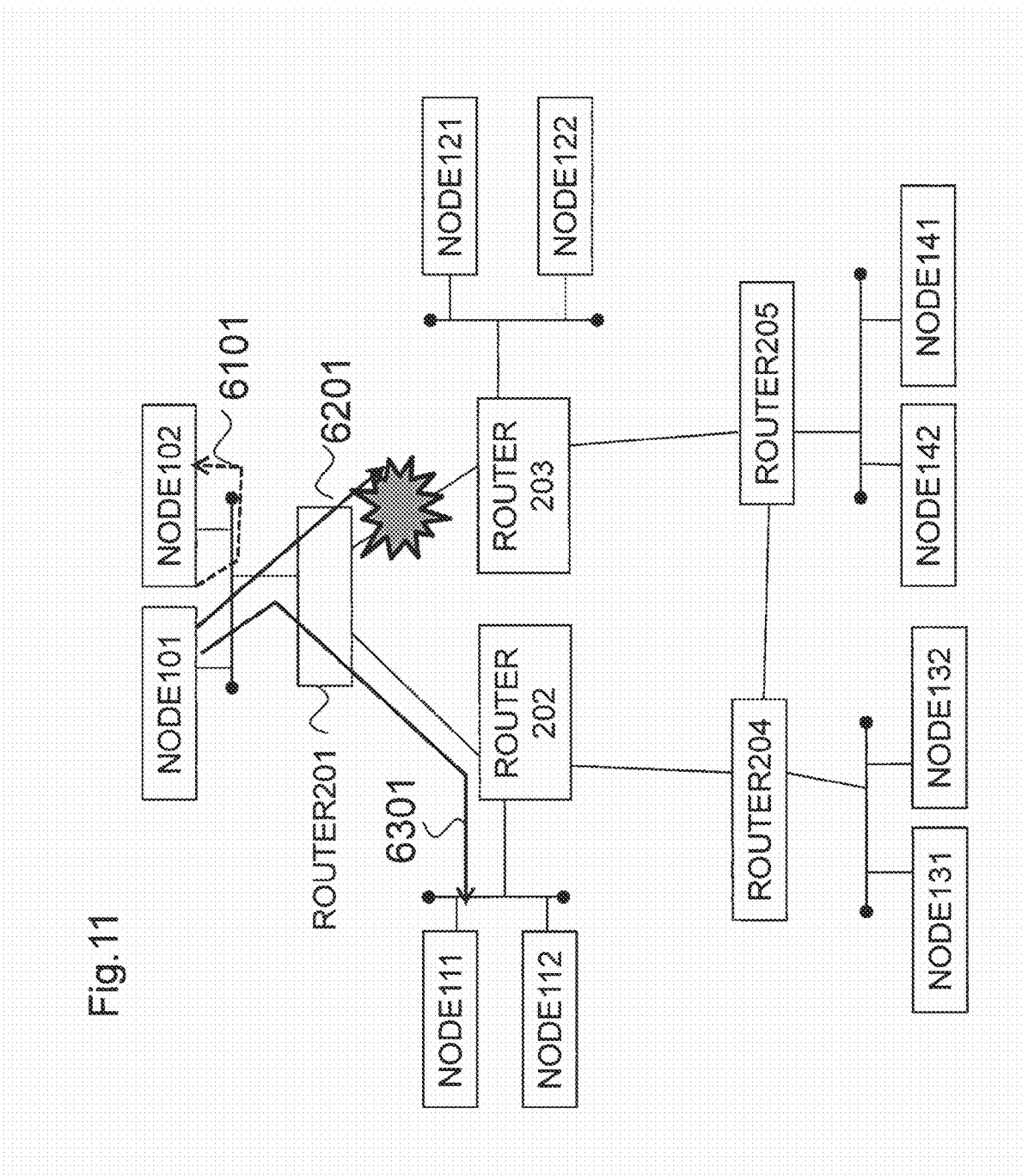
FIG. 11 is a diagram for explaining a communication sequence in a failure state.

As shown in FIG. 11, the origin node 101 sends data to the node 102 connected to the LAN, and also to the nodes 111 and 121 each connected to another LAN (6101, 6201, 6301). However, because of the link failure, data 6201 sent to the node 121 is discarded by the router 201, and accordingly does not reach the node 121. The node 101 sets a retransmission timer with respect to each of the nodes 111, 121 and 102.

Figure 12:
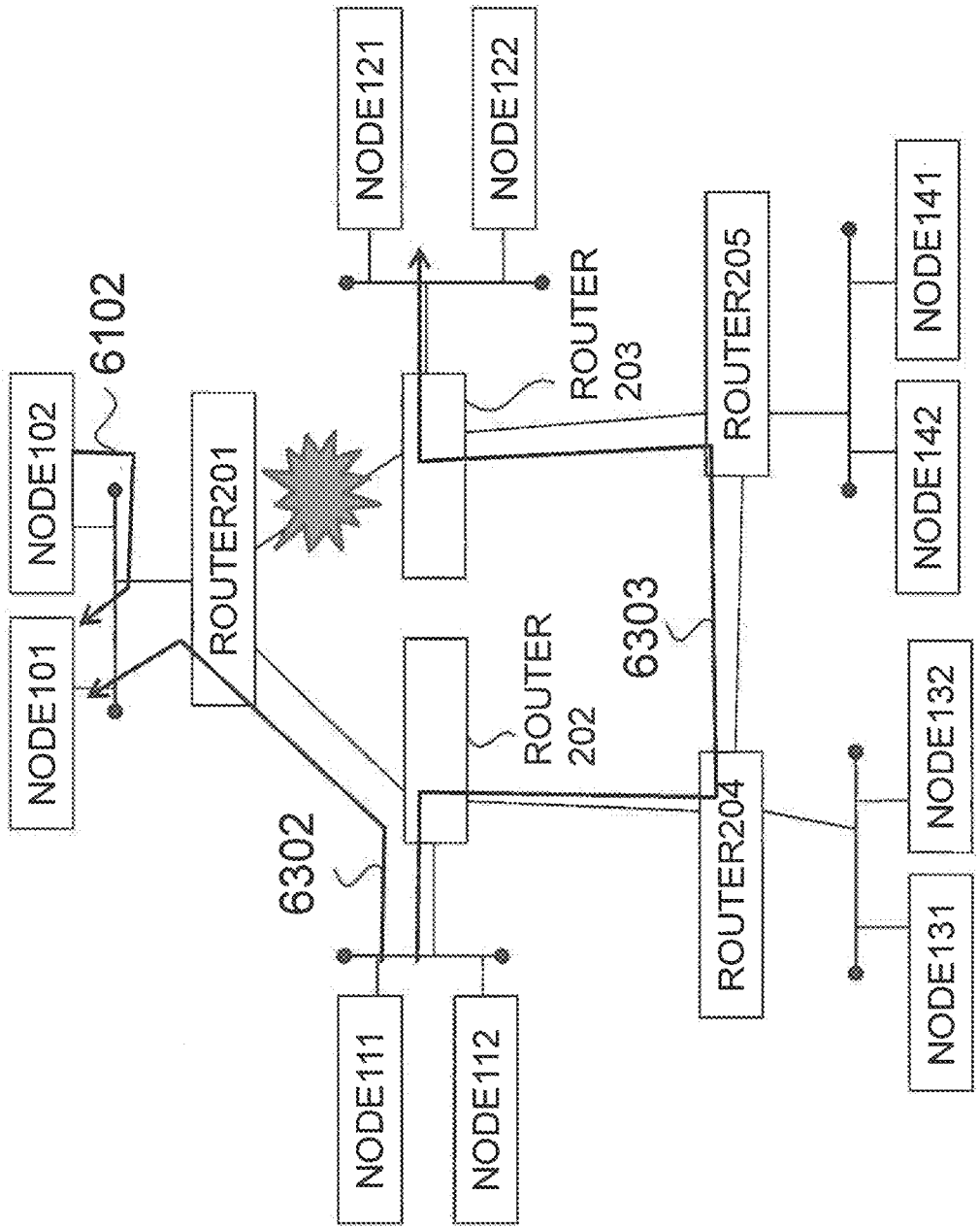
FIG. 12 is a diagram for explaining the communication sequence in the failure state.

As shown in FIG. 12, the node 102 responds to the node 101 by sending it an ACK(Complete) (6102). Receiving the ACK, the node 101 releases the retransmission timer with respect to the node 102. The node 111 responds to the nodes 101 and 121 by sending an ACK(Pending) to each of them (6302, 6303). Receiving the ACK, the node 101 releases the retransmission timer with respect to the node 111. The node 121 stores its reception of the ACK from the node 111 which is the parent node of the redundant path, with respect to data it has not received.

Figure 13:
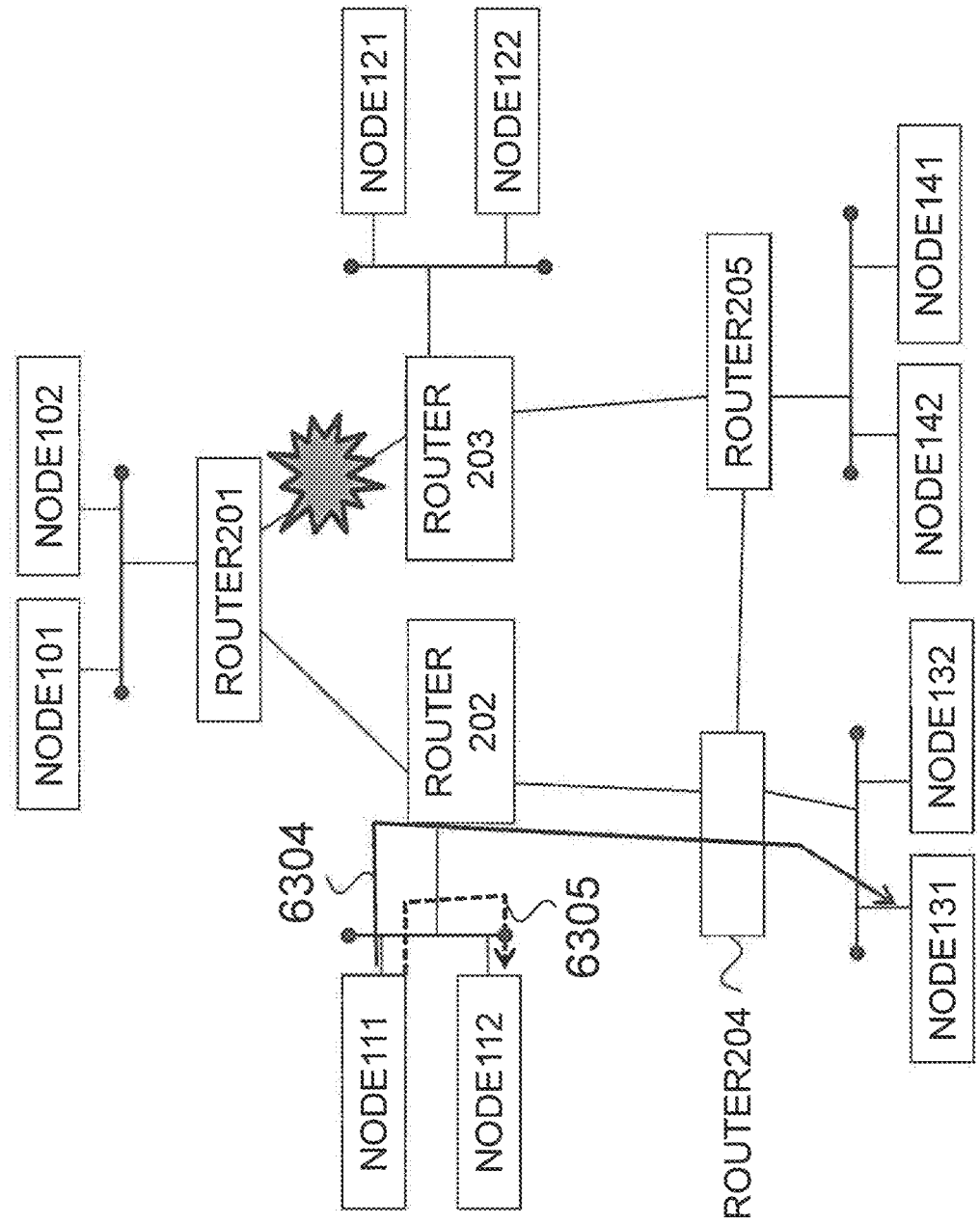
FIG. 13 is a diagram for explaining the communication sequence in the failure state.

As shown in FIG. 13, the node 111 forwards the data to the node 112 by IP multicast via the LAN (6305). It further forwards the data also to the node 131, which is a forwarding node connected to another LAN, by IP unicast (6304). The node 111 sets retransmission timers with respect to the nodes 112 and 131. It further sets a retransmission timer with respect to the node 121, which is a child node on the corresponding redundant path.

Figure 14:
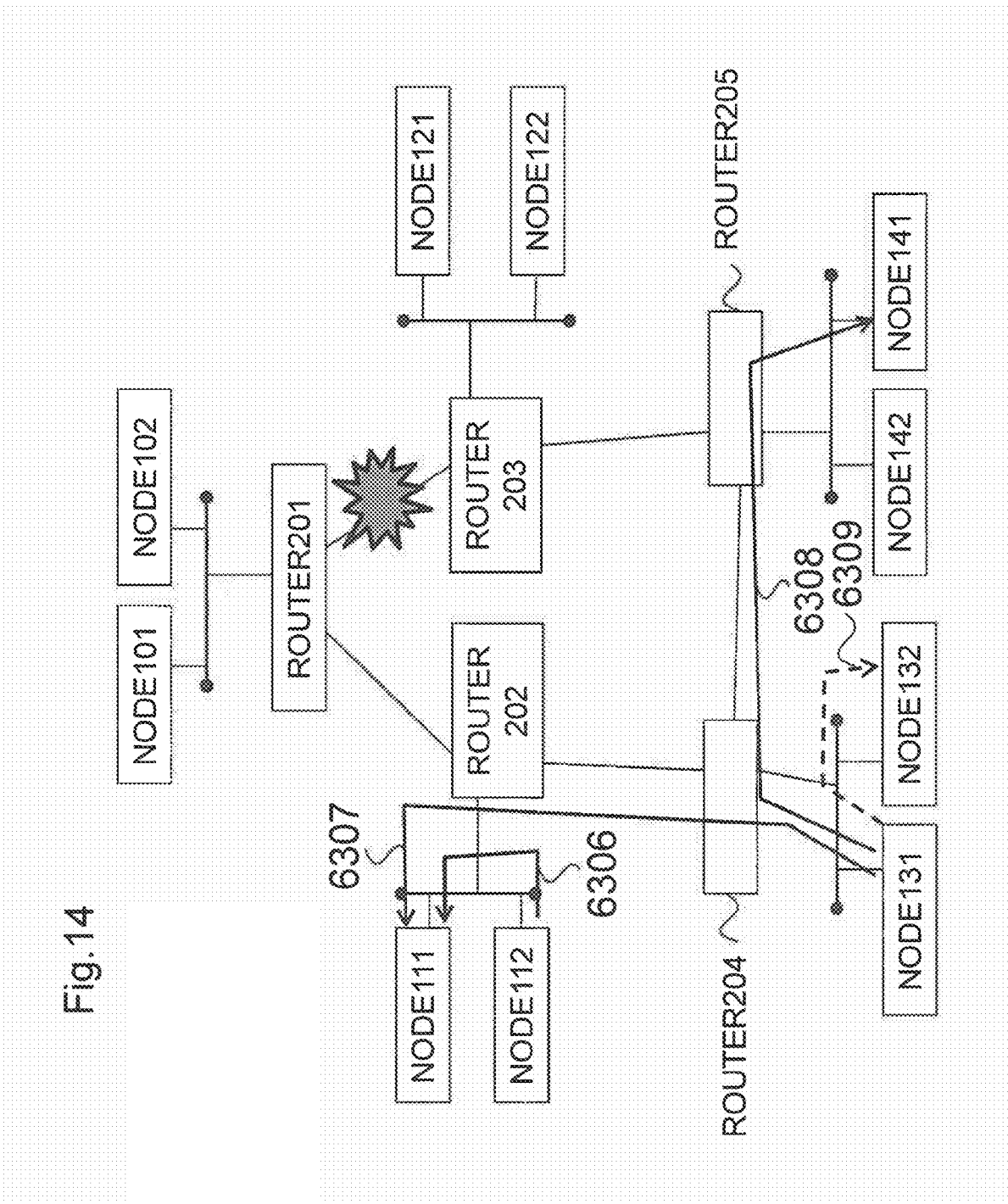
FIG. 14 is a diagram for explaining the communication sequence in the failure state.

As shown in FIG. 14, the node 112 responds to the node 111 by sending it an ACK(Complete) (6306). Receiving the ACK, the node 111 releases the retransmission timer with respect to the node 112. The node 131 responds to the node 111 by sending it an ACK(Pending) (6307). The node 131 further sends an ACK(Pending) also to the node 141, which is a child node on the corresponding redundant path (6308).

The node 131 forwards the data to the node 132 by IP multicast via the LAN (6309). The node 131 sets retransmission timers with respect to the node 132 and the node 141 being a child node on the redundant path.

Receiving the ACK from the node 131, the node 111 releases the retransmission timer with respect to the node 131.

The node 141 stores its reception of the ACK from the node 131 which is the parent node of the redundant path, with respect to data it has not received.

Figure 15:
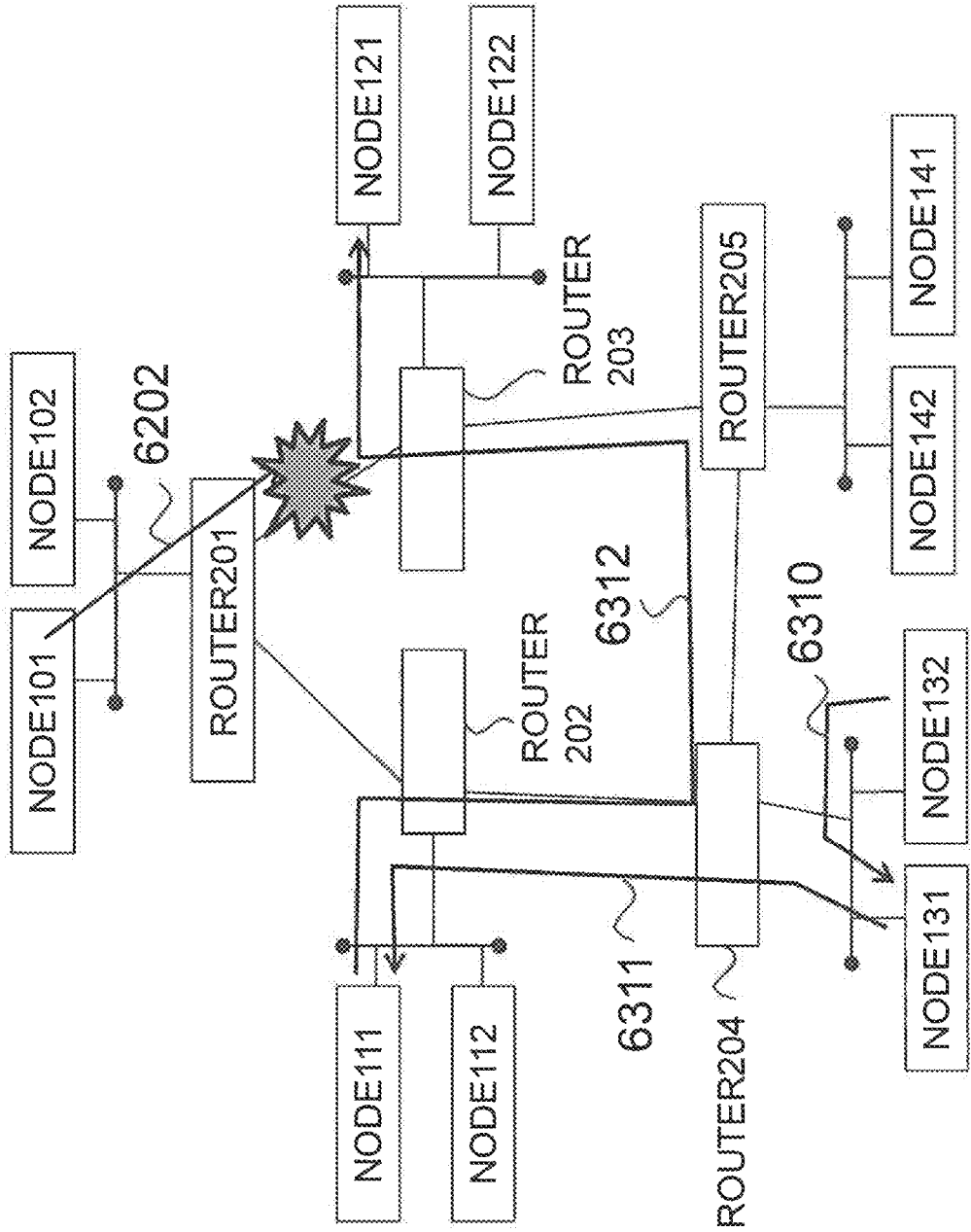
FIG. 15 is a diagram for explaining the communication sequence in the failure state.

As shown in FIG. 15, in the node 101, there occurs timeout of the retransmission timer with respect to the node 121, and accordingly, the node 101 resends the data to the node 121 (6202). However, the data does not reach the node 121, being discarded again owing to the failure.

Also in the node 111, there occurs timeout of the retransmission timer with respect to the node 121, and accordingly, the node 111 sends the data to the node 121 (6312).

The node 132 sends back an ACK(Complete) to the node 131 (6310). Receiving the ACK, the node 131 becomes in a state where it has received an ACK(Complete) from every recipient node subordinate to it, and accordingly, the node 131 sends an ACK(Complete) to the node 111 (6311).

Figure 16:
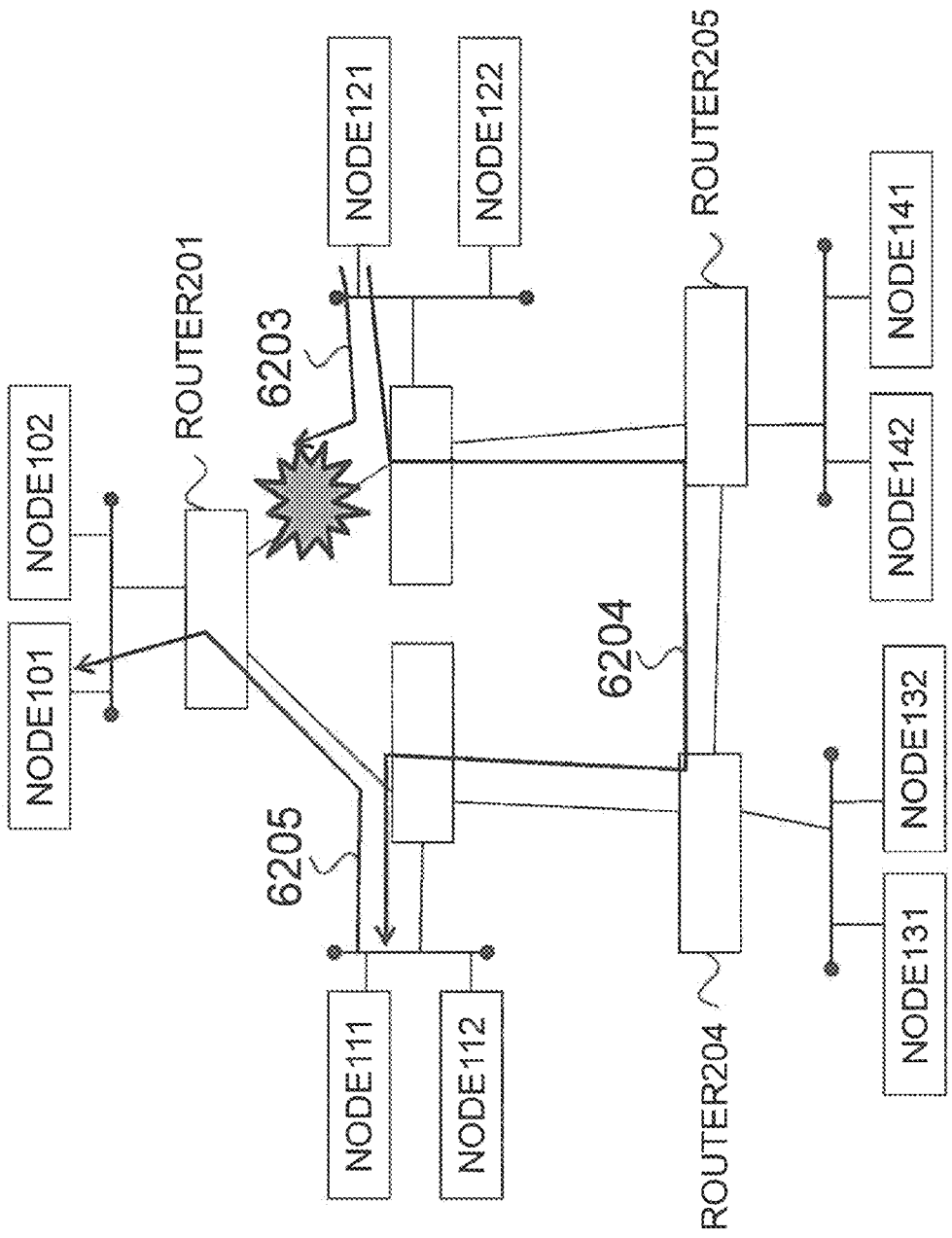
FIG. 16 is a diagram for explaining the communication sequence in the failure state.

As shown in FIG. 16, receiving the data from the node 111, the node 121 sends an ACK(Pending) to both the node 101, which is the parent node of the normal path, and the node 111, which is the parent node of the redundant path (6203 and 6204). Because the node 121 has received the data not from the parent node of the normal path, the node 101, but from the parent node of the redundant path, the node 111, it adds, to the ACK(Pending) to be sent to the node 111, information on the node 111 as the node from which the data has been received (as the parent node of the redundant path) and on the node 101 as the parent node of the normal path. The ACK (6203) sent to the node 101 is discarded owing to the failure, and accordingly does not reach the node 101.

The node 111 receives the ACK(Pending) from the node 121. Confirming that the ACK contains information on itself as the node(as the parent node of the redundant path) from which the node 121 received the data, the node 111 forwards the ACK to the node 101, which is the parent node of the normal path for the node 121 (6205).

Receiving the ACK(Pending) forwarded by the node 111, the node 101 releases the retransmission timer with respect to the node 121.

Figure 17:
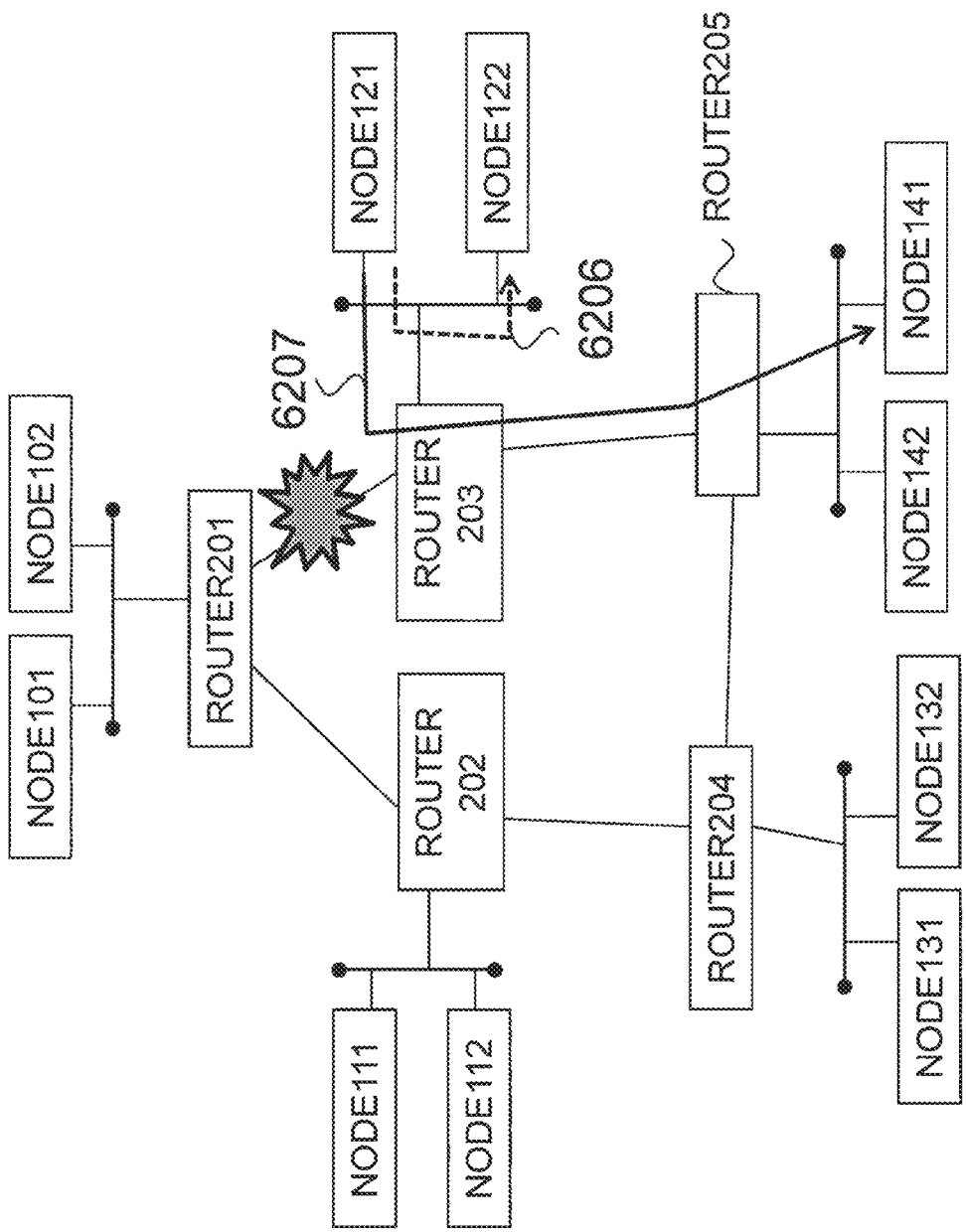
FIG. 17 is a diagram for explaining the communication sequence in the failure state.

As shown in FIG. 17, the node 121 forwards the received data to the node 122 by IP multicast via the LAN (6206). It further forwards the data to the node 141 by IP unicast (6207). The node 121 sets a retransmission timer with respect to each of the nodes 122 and 141.

Figure 18:
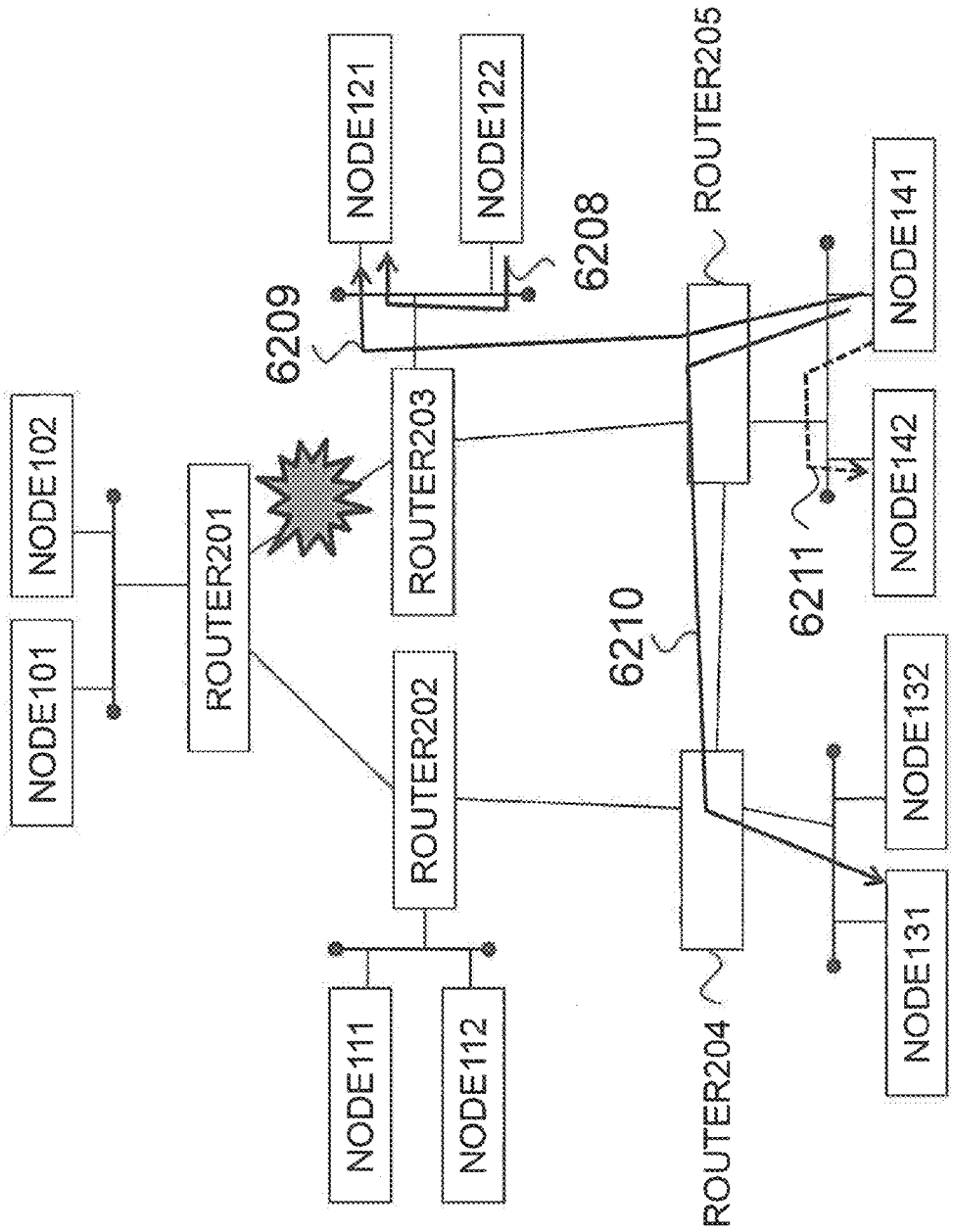
FIG. 18 is a diagram for explaining the communication sequence in the failure state.

As shown in FIG. 18, receiving the data, the node 122 sends an ACK(Complete) to the node 121 (6208). Receiving the ACK, the node 121 releases the retransmission timer with respect to the node 122.

The node 141 sends an ACK(Pending) to both the node 121 and the node 131, which is the parent node of the corresponding redundant path (6209, 6210). Receiving the ACK from the node 141, the node 131 releases the retransmission timer with respect to the node 141. The node 141 forwards the data to the node 142 by IP multicast via the LAN (6211).

Figure 19:
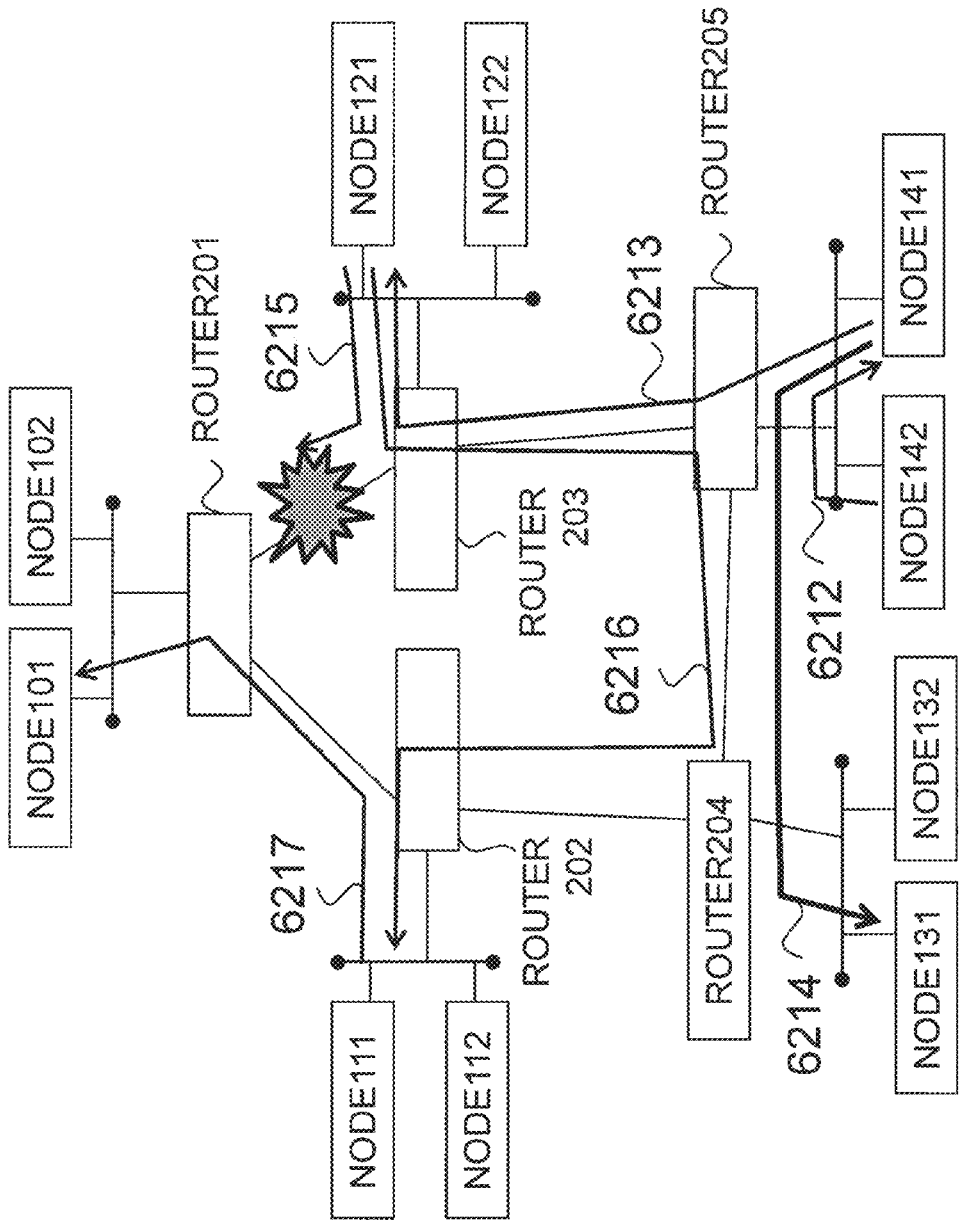
FIG. 19 is a diagram for explaining the communication sequence in the failure state.

As shown in FIG. 19, receiving the data, the node 142 responds to the node 141 by sending it an ACK(Complete) (6212). Receiving the ACK, the node 141 confirms that it has received an ACK(Complete) from every recipient node subordinate to it, and accordingly sends an ACK(Complete) to both the node 121 and the node 131, which is the parent node of the redundant path (6213, 6214).

Confirming that it has received an ACK(Complete) from every recipient node subordinate to it, the node 121 sends an ACK(Complete) to both the node 101, which is the parent node of the normal path, and the node 111, which is the parent node of the corresponding redundant path (6215, 6216). Because the node 121 has received the data not from the parent node of the normal path, the node 101, but from the parent node of the redundant path, the node 111, it adds, also to the ACK(Complete) to be sent to the node 111, information on the node 111 as the node from which the data has been received and on the node 101 as the parent node of the normal path.

The ACK (6215) sent to the node 101 is discarded owing to the failure, and accordingly does not reach the node 101.

The node 111 receives the ACK(Complete) from the node 121. Confirming that the information added to the ACK includes information on itself as the node from which the node 121 received the data, the node 111 forwards the ACK to the node 101, which is the parent node of the normal path for the node 121 (6217).

Receiving the ACK(Complete), which was sent by the node 121 and then forwarded by the node 111, the node 101 confirms that it has received an ACK(Complete) from every recipient node subordinate to it, and accordingly recognizes that all recipient nodes in the network have received the data with no fail.

As has been described above, according to the present invention, in overlay multicast, data distribution can be performed securely within a restricted time and the sender node can confirm the reception status, even at a time of network failure, by performing data distribution from a parent node of a redundant path and confirming the distribution via the parent node of the redundant path.

The communication node device according to the above-described exemplary embodiment of the present invention may be realized by a CPU (Central Processing Unit) reading an operation program or the like from a storage unit and executing it, and may also be constituted by hardware. Also, only some of the functions of the above-described exemplary embodiment may be realized by a computer program.

The whole or part of the exemplary embodiments disclosed above can be described as, but not limited to, the following supplementary notes.

(Supplementary Note 1) A multicast communication method in a network constituted by a plurality of communication nodes, which is characterized by that:

when a parent node has forwarded data to a child node subordinate to it along a normal distribution path, the parent node sets a retransmission timer also with respect to a child node on a redundant distribution path; and a communication node, when having received data, sends a reception confirmation message to both a parent node of a normal distribution path and a parent node of a redundant distribution path.

(Supplementary Note 2) The multicast communication method according to supplementary note 1, which is characterized by that:

when a child node has received data from the parent node of a redundant distribution path, information on the parent node of the redundant distribution path is added to said reception confirmation message, which is the sender of the data, and information on the parent node of the normal distribution path; and when a parent node has received a reception confirmation message to which information on the parent node of a redundant distribution path, being the sender of the corresponding data, and information on the parent node of a normal distribution path are added, if the parent node having received the reception confirmation message itself is equal to the parent node of the redundant distribution path, which is the sender and added to the reception confirmation message, the parent node having received the reception confirmation message forwards the reception confirmation message to the parent node of the normal distribution path added to the reception confirmation message.

(Supplementary Note 3) The multicast communication method according to supplementary note 1 or 2, which is characterized by that:

if a communication node itself is a forwarding node of a distribution path, the child node, when having received data, sends a first reception confirmation message to both the parent node of the normal distribution path and the parent node of the redundant distribution path;

if the communication node itself is the end node of a distribution path, the child node, when having received data, sends a second reception confirmation message to the parent node of the normal path; and when the communication node itself has received the second reception confirmation message from every child node on its own distribution path, the child node sends the second reception confirmation message to both the parent node of the normal distribution path and the parent node of the redundant distribution path.

(Supplementary Note 4) A communication node device constituting a communication system performing multicast, which is characterized by that:

when having forwarded data to a child node subordinate to it along the normal distribution path, the communication node device sets a retransmission timer also with respect to a child node on a redundant distribution path; and when having received data, the communication node device sends a reception confirmation message to both the parent node of the normal distribution path and the parent node of the redundant distribution path.

(Supplementary Note 5) The communication node device according to supplementary note 4, which is characterized by that:

when having received data from the parent node of a redundant distribution path, the communication node device adds information on the parent node of the redundant distribution path, which is the sender of the data, and information on the parent node of the normal distribution path, to said reception confirmation message; and when having received a reception confirmation message to which information on the parent node of a redundant distribution path, being the sender of the corresponding data, and information on the parent node of a normal distribution path are added, if the communication node device itself is equal to the parent node of the redundant distribution path, being the sender, added to the reception confirmation message, the communication node device forwards the reception confirmation message to the parent node of the normal distribution path added to the reception confirmation message.

(Supplementary Note 6) The communication node device according to supplementary note 4 or 5, which is characterized by that:

if the communication node itself is a forwarding node of a distribution path, it sends a first reception confirmation message to both the parent node of the normal distribution path and the parent node of the redundant distribution path when having received data;

if the communication node itself is the end node of a distribution path, it sends a second reception confirmation message to the parent node of the normal path when having received data; and when having received the second reception confirmation message from every child node on its own distribution path, the communication node sends the second reception confirmation message to both the parent node of the normal distribution path and the parent node of the redundant distribution path.

(Supplementary Note 7) A program for multicast communication, which is characterized by that it causes a computer to execute:

a step of, when having forwarded data to a subordinate child node along the normal distribution path, setting a retransmission timer also with respect to a child node on a redundant distribution path; and a step of, when having received data, sending a reception confirmation message to both the parent node of the normal distribution path and the parent node of the redundant distribution path.

(Supplementary Note 8) The program according to supplementary note 7, which is characterized by that it causes said computer to further execute:

a step of, when having received data from the parent node of a redundant distribution path, adding information on the parent node of the redundant distribution path, which is the sender of the data, and information on the parent node of the normal distribution path, to said reception confirmation message; and a step of, when having received a reception confirmation message to which information on the parent node of a redundant distribution path, which is the sender of the corresponding data, and information on the parent node of the normal distribution path are added, forwarding the reception confirmation message to the parent node of the normal distribution path added to the reception confirmation message if the node itself of the program is equal to the parent node of the redundant distribution path, which is the sender and added to the reception confirmation message.

(Supplementary Note 9) The program according to supplementary note 7 or 8, which is characterized by that it causes said computer to further execute:

if the node itself is a forwarding node of a distribution path, a step of, when having received data, sending a first reception confirmation message to both the parent node of the normal distribution path and the parent node of the redundant distribution path;

if the node itself is the end node of a distribution path, a step of, when having received data, sending a second reception confirmation message to the parent node of the normal path; and a step of, when having received the second reception confirmation message from every child node on its own distribution path, sending the second reception confirmation message to both the parent node of the normal distribution path and the parent node of the redundant distribution path.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2012-115398, filed on May 21, 2012, the disclosure of which is incorporated herein in its entirety by reference.

REFERENCE SIGNS LIST 101, 102, 111, 112, 131, 132, 141, 142 Node
201 to 205 router

The invention claimed is:

1. A multicast communication method in a network constituted by a plurality of communication nodes, wherein:
a communication node, when having forwarded data to a child node subordinate to it along a normal distribution path, sets a retransmission timer also with respect to a child node on a redundant distribution path;
a communication node, when having received data, sends a reception confirmation message to both a parent node of the normal distribution path and a parent node of the redundant distribution path, and
wherein:
a child node, upon receiving data from the parent node of the redundant distribution path, adds information on the parent node of the redundant distribution path, being a sender of the data, and on the parent node of the normal distribution path, to said reception confirmation message; and
a parent node, upon receiving a reception confirmation message with information on the parent node of the redundant distribution path being a sender of the corresponding data and on the parent node of a normal distribution path added to it, forwards the reception confirmation message to the parent node of the normal distribution path added to the reception confirmation message if the parent node having received the reception confirmation message itself is equal to the parent node of the redundant distribution path, which is the sender and added to the reception confirmation message.

2. The multicast communication method according to claim 1, wherein
a communication node:
if being a forwarding node of a distribution path, upon receiving data, sends a first reception confirmation message to both the parent node of the normal distribution path and the parent node of the redundant distribution path;
if being an end node of a distribution path, upon receiving data, sends a second reception confirmation message to the parent node of the normal distribution path; and
when having received the second reception confirmation message from every child node on its own distribution path, sends the second reception confirmation message to both the parent node of the normal distribution path and the parent node of the redundant distribution path.

3. A multicast communication method in a network constituted by a plurality of communication nodes, wherein:
a communication node, when having forwarded data to a child node subordinate to it along a normal distribution path, sets a retransmission timer also with respect to a child node on a redundant distribution path;
a communication node, when having received data, sends a reception confirmation message to both a parent node of the normal distribution path and a parent node of the redundant distribution path, wherein
a communication node:
if being a forwarding node of a distribution path, upon receiving data, sends a first reception confirmation message to both the parent node of the normal distribution path and the parent node of the redundant distribution path;
if being an end node of a distribution path, upon receiving data, sends a second reception confirmation message to the parent node of the normal distribution path; and
when having received the second reception confirmation message from every child node on its own distribution path, sends the second reception confirmation message to both the parent node of the normal distribution path and the parent node of the redundant distribution path.

4. A communication node device constituting a communication system performing multicast, the communication node device performing:
when having forwarded data to a child node subordinate to the communication node device along a normal distribution path, setting a retransmission timer also with respect to a child node on a redundant distribution path; and
upon receiving data, sending a reception confirmation message to both a parent node of the normal distribution path and a parent node of the redundant distribution path,
the communication node device performing:
when having received data from the parent node of the redundant distribution path, adding information on the parent node of the redundant distribution path being a sender of the data and information on the parent node of the normal distribution path, to said reception confirmation message; and
upon receiving a reception confirmation message with information on the parent node of the redundant distribution path, which is a sender of the corresponding data, and on the parent node of the normal distribution path added to it, forwarding the reception confirmation message to the parent node of the normal distribution path added to the reception confirmation message if the communication node device itself is equal to the parent node of the redundant distribution path, which is a sender and added to the reception confirmation message.

5. The communication node device according to claim 4, the communication node device performing:
if being a forwarding node of a distribution path, upon receiving data, sending a first reception confirmation message to both the parent node of the normal distribution path and the parent node of the redundant distribution path;
if being an end node of a distribution path, upon receiving data, sending a second reception confirmation message to the parent node of the normal distribution path; and when having received the second reception confirmation message from every child node on its own distribution path, sending the second reception confirmation message to both the parent node of the normal distribution path and the parent node of the redundant distribution path.

6. A communication node device constituting a communication system performing multicast, the communication node device performing:

when having forwarded data to a child node subordinate to the communication node device along a normal distribution path, setting a retransmission timer also with respect to a child node on a redundant distribution path; and upon receiving data, sending a reception confirmation message to both a parent node of the normal distribution path and a parent node of the redundant distribution path, the communication node device performing:

if being a forwarding node of a distribution path, upon receiving data, sending a first reception confirmation message to both the parent node of the normal distribution path and the parent node of the redundant distribution path;

if being an end node of a distribution path, upon receiving data, sending a second reception confirmation message to the parent node of the normal distribution path; and when having received the second reception confirmation message from every child node on its own distribution path, sending the second reception confirmation message to both the parent node of the normal distribution path and the parent node of the redundant distribution path.

* * * * *